US00H002156H

(19) United States

(12) Statutory Invention Registration

Schleyer

(10) Reg. No.: US H2156 H

(43) Published: May 2, 2006

(54) GASOLINE FUEL

(76) Inventor: Charles Hall Schleyer, 118 Liberty La., Lincoln University, PA (US) 19352

(21) Appl. No.: 09/784,885

(22) Filed: Feb. 16, 2001

Related U.S. Application Data

(63) Continuation-in-part of application No. 09/226,409, filed on Jan. 6, 1999, now abandoned.

(60) Provisional application No. 60/070,814, filed on Jan. 8, 1998.

(51) Int. Cl.
*C10L 1/04* (2006.01)

(52) U.S. Cl. ..... 585/14; 208/14; 208/15; 208/16; 208/17

(58) Field of Classification Search ..... 585/14; 208/14–17

See application file for complete search history.

(56) References Cited

U.S. PATENT DOCUMENTS

| | | | | | |
|---|---|---|---|---|---|
| 4,525,174 | A | | 6/1985 | Croudace | 44/68 |
| 4,600,408 | A | | 7/1986 | Jessup et al. | 44/70 |
| 4,602,919 | A | | 7/1986 | Jessup et al. | 44/70 |
| 4,647,292 | A | | 3/1987 | Jessup et al. | 44/66 |
| 4,699,629 | A | | 10/1987 | Croudace et al. | 44/79 |
| 4,720,288 | A | | 1/1988 | Croudace et al. | 44/72 |
| 4,743,273 | A | | 5/1988 | Croudace et al. | 44/71 |
| 4,773,916 | A | | 9/1988 | Croudace et al. | 44/79 |
| 4,781,728 | A | | 11/1988 | Jessup et al. | 44/56 |
| 4,812,146 | A | | 3/1989 | Jessup | 44/77 |
| 4,824,552 | A | | 4/1989 | Nagasawa et al. | 208/17 |
| 4,899,014 | A | | 2/1990 | Avidan et al. | 585/533 |
| 5,032,144 | A | | 7/1991 | Jessup et al. | 44/384 |
| 5,288,393 | A | * | 2/1994 | Jessup et al. | 208/16 |
| H1305 | H | * | 5/1994 | Townsend et al. | 44/449 |
| 5,593,567 | A | * | 1/1997 | Jessup et al. | 208/46 |
| 5,653,866 | A | * | 8/1997 | Jessup et al. | 208/46 |
| H1716 | H | * | 4/1998 | Rapp et al. | 208/17 |
| 5,837,126 | A | * | 11/1998 | Jessup et al. | 208/16 |
| 6,132,479 | A | | 10/2000 | Welstand et al. | 44/300 |

* cited by examiner

*Primary Examiner*—M. Clement

(57) ABSTRACT

Total combustion and evaporative emissions from gasoline pump fuels can be controlled with total emissions no higher than those currently allowed by the addition of an evaporative factor such as RVP to the model predicting emissions, based on a number of considerations including the sensitivity of emission parameters (toxics, hydrocarbons, CO and NOx) as related to the variables in the predictive model (oxygenate content, sulfur, $T_{90}$, $T_{50}$, aromatics, olefins, benzene and RVP). The present pump gasolines will normally have compositions including $T_{10}$ no greater than 140° F., $T_{90}$ no greater than 330° F., RVP no greater than 7 psi and usually lower and sulfur no greater than 50 ppmw. Oxygenates may be eliminated, permitting $T_{50}$ values to increase which is not unfavorable from the viewpoint of total emissions provided other parameters are held within specified limits. Aromatics, olefins and benzene are normally held to maximum of 35, 10 and 1 vol % respectively to achieve satisfactorily low total emissions.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GASOLINE FUEL

CROSS REFERENCE TO RELATED APPLICATIONS

This application is a continuation-in-part of U.S. Ser. No. 09/226,409 filed Jan. 6, 1999 now abandoned which claims priority of U.S. Ser. No. 60/070,814 filed Jan. 8, 1998.

FIELD OF THE INVENTION

The present invention relates to fuels and particularly to gasoline fuels suitable for use in road vehicles. It is more particularly directed to gasoline fuels suitable for use in road vehicles as a standard pump fuel suitable to be supplied throughout the manufacturing and distribution system of the petroleum refining industry in large quantities.

BACKGROUND OF THE INVENTION

One of the major environmental problems confronting certain areas including major cities, in the United States and other countries is of atmospheric pollution associated with the emission of gaseous pollutants from automobiles, including both evaporative emissions and exhaust gas pollutants. This problem may be acute in major metropolitan areas such as Los Angeles, Calif. where atmospheric conditions in combination with large numbers of automobiles create appropriate conditions for aggravated air pollution.

In addition to evaporative emissions from the gasoline tanks of the vehicles and emissions from product terminals and tankers, hydrocarbons are also found as unburned or incompletely burned hydrocarbons in the exhaust emissions together with nitrogen oxides (NOx) and carbon monoxide (CO), all of which contribute to air pollution.

The composition of motor gasolines commercially sold for normal road vehicle use in certain areas of the United States is now restricted by Federal and, in some cases, by State regulations. The California Air Resources Board (CARB) has established a legal reference framework for the sale of motor gasolines in California which is intended to reduce the severity and extent of air pollution in that State from gasoline powered road vehicles and other mobile sources fueled with motor gasoline. The CARB regulations for Clean Burning Gasolines (CBG) are found in Title 13 of the California Code of Regulations, principally in Sections 2260 et seq., with Sections 2260 to 2270 dealing with the predictive model (PM) established under the regulations. Reference is made to these regulations as well as to the document "California Procedures for Evaluating Alternative Specifications for Phase II Reference Gasolines Using the California Predictive Model", for details of the model and the test procedures to be used in conjunction with it. The present invention deals mainly with gasolines which either conform to the California regulations or which provide emissions no higher than those permitted under the current regulations. The US federal regulations are set by the Environmental Protection Administration (EPA) which has established initially a simple predictive model (the Simple Model) and, subsequently, a Complex Predictive Model (the Complex Model) for predicting vehicle evaporative and exhaust emissions.

The CARB Regulations regulate the composition of road vehicle motor gasolines in two ways. A simple prescriptive compositional standard for CBG may be followed but as an alternative, a fuel may be evaluated by the predictive model with the requirement that exhaust emissions should be no higher than those resulting from a fuel which conforms to the compositional specifications. The predictive model ultimately sets limits on vehicle emissions according to various compositional parameters, for example, sulfur, olefins and aromatics contents as well as by reference to distillation characteristics including the distillation points including the 10%, 50% and 90% distillation points ($T_{10}$, $T_{50}$, $T_{90}$) of the gasoline. The "D-86 Distillation Point" refers to the distillation point obtained by the procedure identified as ASTM D 86-82, which can be found in the 1990 Annual Book of ASTM Standards, Section 5, Petroleum Products, Lubricants, and Fossil Fuels. Unlike the EPA model, the CARB predictive model has no specification for evaporative emissions, as commonly measured by the Reid Vapor Pressure (RVP) method, confining itself to exhaust emissions produced on the combustion of the gasoline fuels. "Reid Vapor Pressure" (RVP) is a pressure determined by a conventional analytical method for determining the vapor pressure of petroleum products. In essence, a liquid petroleum sample is introduced into a chamber, then immersed in a bath at 100° F. (37.8° C.) until a contstant pressure is observed. Thus, the RVP is the difference, or the partial pressure, produced by the sample at 100° F. (37.8° C.). The complete test procedure is reported as ASTM test method D-323-89 in the 1990 Annual Book of ASTM Standards, Section 5, Petroleum Products, Lubricants, and Fossil Fuels. The EPA Complex Model provides a predictive model for evaporative effects of various compositions and it appears that consideration of evaporative emissions is a relevant factor since a review of recent CARB emission inventories indicates that evaporative emissions contribute about 30% to total hydrocarbon emissions.

CBG specifications set by CARB set absolute limits on certain gasoline parameters such as sulfur content and, in addition, permit the compositions of pump gasolines to be varied within these absolute limits either by composition on a per gallon or an averaged basis or by reference to the Predictive Model. The compositional specifications are as shown in Table 1 which follows:

TABLE 1

CBG Gasoline Specifications

| Property | Caps | Per Gallon | Average |
|---|---|---|---|
| Sulfur, ppm | 80 | 40 | 30 |
| Benzene, wt % | 1.2 | 1.0 | 0.8 |
| Aromatics, vol % | 30 | 25 | 22 |
| Olefins, vol % | 10 | 6 | 4 |
| Oxygen, wt % | 2.7 | 1.8/2.2 | |
| RVP, psi | 7.0 | 7.0 | |
| $T_{50}$, ° F. | 220 | 210 | 200 |
| $T_{90}$, ° F. | 330 | 300 | 290 |

The oxygenate content, set at a maximum of 2.7 wt % in Table 1 above (as oxygen, corresponding to about 10 wt % or more, e.g., 12 wt % as actual oxygenate), may be increased to 3.5 percent under a proposal being considered by CARB. See Notice of Continuation of Public Hearing to Consider an Amendment to the California cleaner Burning Gasoline Regulations by Increasing the Cap Limit for Oxygen from 2.7 to 3.5 Percent by Weight, Hearing set for 10 Dec. 1998, Sacramento, Calif. The oxygenate content may be varied under the predictive model as long as the fuel results in emmissions no worse than those resulting from the average/per gallon fuel selected as the basis for comparison. The federal RFG oxygenate requirement has to be observed year round in the California areas covered by federal RFG (Los Angeles, Sacramento and San Diego) and in addition, a minimum 1.8 wt. pct. oxygen is required in certain areas in California during the winter for CO control (Los Angeles Metro area, Imperial County and for the next two years only Fresno and Lake Tahoe).

Proposals have been made in the past for the development of motor gasolines which produce lower amounts of gaseous pollutants on combustion, notably U.S. Pat. Nos. 5,288,393; 5,593,567; 5,653,866 and 5,837,126, Jessup et al., assigned to Union Oil Company of California. According to the Jessup patents, the principal factor influencing the hydrocarbon and/or CO exhaust emissions is the 50% distillation point ($T_{50}$) which is held at a maximum value of 215° F. (102° C.) with the hydrocarbon and CO emissions progressively decreasing as $T_{50}$ is reduced below this value. It is stated that preferred fuels have $T_{50}$ of 205° F. (96° C. or less) with best results being attained with T_being below 195° F. (91° C.) NOx emissions are stated to be minimized or reduced in dependence upon RVP as the principal factor with $T_{10}$ as a secondary factor. NOx emissions are stated to decrease as RVP is decreased to 8.0 psi (0.54 atm) or less, preferably to 7.5 psi (0.51 atm) or less with an expressed preference for values below 7.0 psi (0.48 atm). The 10% distillation point and the olefin content are stated to be of secondary importance with respect to NOx emissions with olefin contents below 15 vol % providing some reduction in NOx emissions, preferably with zero content of olefins. The 10% point ($T_{10}$) is stated to provide some reduction in NOx emissions at values below 140° F. (60° C.). Although decreases in olefin content are likely to be more acceptable to the refiner than decreasing $T_{10}$, it is stated that the olefin content will be the secondary variable providing the most flexibility to the refiner in altering gasoline composition to reduce NOx emissions. The conclusion is expressed that best results are attained when both the olefin content is below 15 vol %, preferably 0, and the RVP is no greater than 7.5 psi (0.51 atm) with the $T_{10}$ preferably being below 140° F. (60° C.). A number of gasoline compositions are set out in the Jessup patents together with calculated and experimental emission data for such fuels.

While the predictive models utilized by the EPA and CARB provide a comprehensive framework for evaluating the potential effects of variations in motor gasoline composition, further development work has shown that it is possible to control emissions effectively—and even to reduce emissions—below current levels while giving the refiner additional flexibility in the compositions of the gasoline's. This is based on a number of considerations including the sensitivity of emission parameters (toxics, hydrocarbons, CO and NOx) as related to the variables in the CARB predictive model (oxygenate content, sulfur, $T_{90}$, $T_{50}$, aromatics, olefins, benzene and RVP). Toxics and total hydrocarbone (THC's) in the CARB predictive model are very sensitive to $T_{50}$ values above 210° F. but these increases can be offset by adjusting other variables including an evaporative factor such as RVP, as well as decreased sulfur. If appropriate adjustments in the compositinal parameters are made it may possibly permit increased olefins levels at the same time, which is a useful consideration for refiners which utilize a significant amount of FCC gasoline in the final blend. While certain compositional variations may fall within existing regulatory limits, certain others fall outside current limits but again, have the potential of providing lower total emissions than those resulting from compositions which are in accordance with current limits. The potential for providing lower total emissions (evaporative and exhaust) indicates that by including an evaporative parameter to the predictive model it may be possible when offsets from other properties are factored in, to provide reductions in hydrocarbon emissions sufficient to offset the increases resulting from an increase in $T_{50}$. Further, the addition of an evaporative parameter to gasoline compositions may be prudent in view of the finding that evaporative emissions approximate to some 32% of total hydrocarbon emissions with projections showing an increase after the year 2000. Reductions in the RVP would provide improved flexibility in manufacturing and blending operations for pump gasoline without environmental harm. In fact, the benefits from including an evaporative parameter in the CARB model could be significant. Each 0.1 psi reduction in RVP provides hydrocarbon emission reductions equivalent to a reduction of 2° F. (1° C.) in $T_{50}$.

The effects of including an evaporative parameter in the fuel certification model and reducing RVP from 7.0 to 6.6 psi in the predictive model were investigated with respect to the CARB predictive model by systematically varying fuel properties within the following ranges: $T_{50}$ 210–220° F., $T_{90}$ 295–330° F., sulfur 5–35 ppm, aromatics 12–28 vol %, and olefins 2–10 vol %. Oxygen was held at 2% and benzene at 0.7%. The percent of fuels tested which meet all CARB emission contraints are summarized in Table 2 below:

TABLE 2

| $T_{50}$, ° F. | Base Model | RVP Added Exhaust and Evaporative | RVP Added Evaporative Only |
|---|---|---|---|
| 210 | 48% | 81% | 63% |
| 212 | 40% | 77% | 61% |
| 214 | 31% | 71% | 57% |
| 216 | 21% | 64% | 52% |
| 218 | 13% | 52% | 44% |
| 220 | 5% | 38% | 34% |

The evaporative parameter here is based on the CARB revised draft "Outline of an Evaporative Modeling Proposal", revised 6 May 1998, original distributed for public consultation 5 Feb. 1998.

From these results it is clear that the addition of an evaporative factor which can account for the beneficial effect of reducing RVP has the potential for improving actual emission levels. In the base model it is difficult to increase $T_{50}$ beyond 214° F. unless sulfur and aromatics are very low. With the RVP factor added, however, there is a significant increase in flexibility and $T_{50}$ levels of 220° F. and higher are possible. The use of $T_{50}$ values above 215° F. therefore becomes possible, with values in the range of 215° F. to 220° F. representing an area in which there is significant potential for the formulation of gasolines with acceptable levels of total emissions according to the standards now prevailing in California. The greatest flexibility is provided when the exhaust RVP effects are also added due to the added NOx benefits.

SUMMARY OF THE INVENTION

According to the present invention, pump gasolines are formulated to have total emissions (evaporative plus combustive) no higher than those which would be permissible under current regulations, specifically the CARB regulations referred to above. Although variation in the current regulations may be required in certain instances, it is believed that actual emissions (total) would be at least equivalent that is, equivalent or better, to those resulting from current fuels. The present gasolines are, of course, lead-free in accordance with current EPA regulations.

Conceptually, the present fuels can be categorized in three ways. The first group of fuels is characterized by a $T_{50}$ in the range of 210 to 215° F. and with other compositional properties including low sulfur levels which confer good emission performance. The second group has an even higher $T_{50}$, in the range of 215 to 220° F. and again with other compositional characteristics which confer good emissions performance. The third group has a low $T_{50}$ value below about 210° F. but here, it has been found that it is possible to enlarge the volume of the gasoline pool by the use of an extended $T_{90}$ about 315° F., normally from 315° F. to 330° F.

The present gasoline fuel compositions may by produced by conventional refining and blending techniques using such refinery processes as distillation, cracking, reforming and alkylation with blending of the appropriate fractions such as naphtha, FCC gasoline, reformate and alkylate.

DETAILED DESCRIPTION

Figure 1:
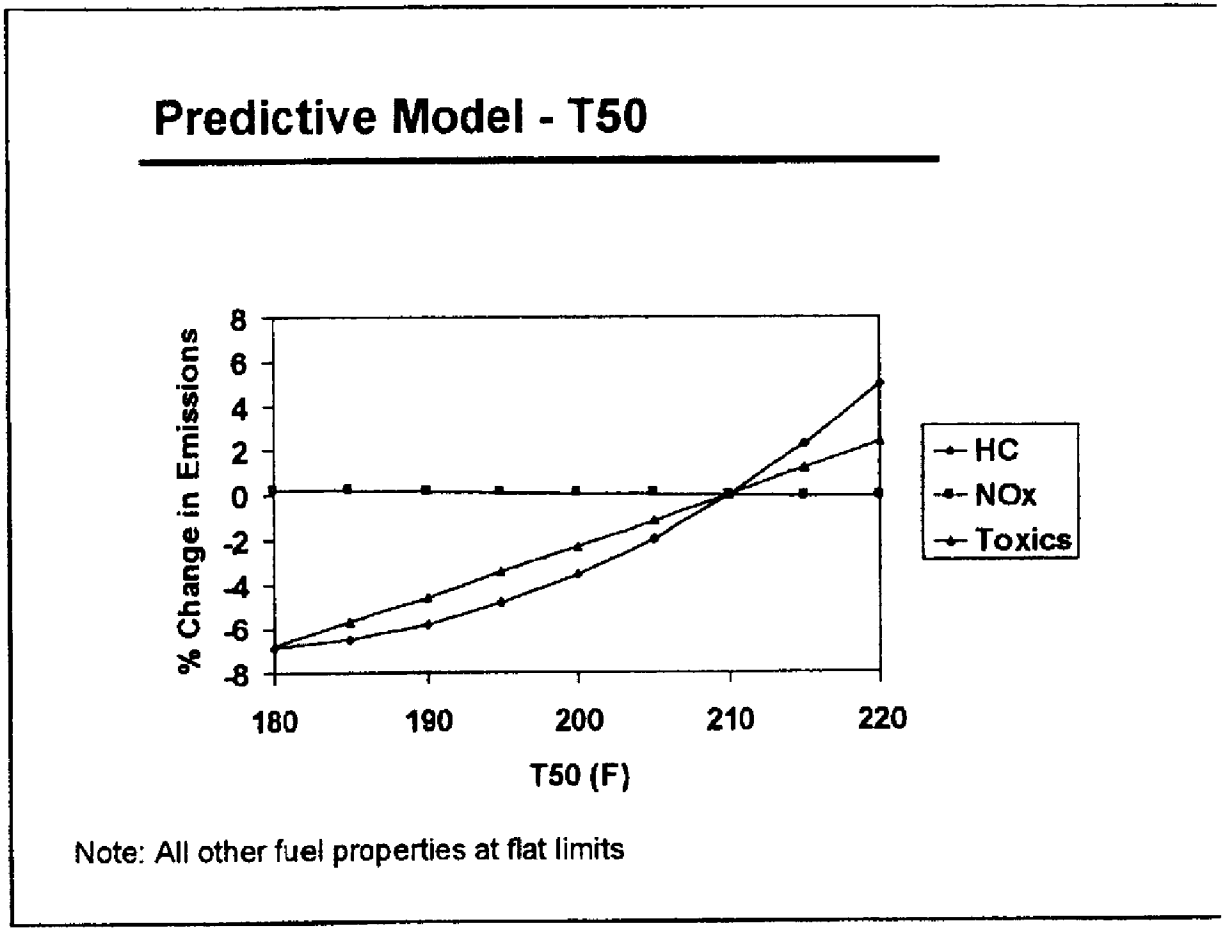
FIG. 1 presents the percentage change in emissions in response to $T_{50}$ (° F.), all other fuel properties being held constant.

In the present gasoline boiling range pump fuels, the following parameters in Table 3 will normally be followed for the compositions which utilize $T_{50}$ values in the range of 210 to 220° F.:

TABLE 3

| | Limits | | |
|---|---|---|---|
| Parameter | Broad | Intermediate | Narrow |
| $T_{10}$, ° F. | <=140 | <=135 | <=130 |
| $T_{50}$, ° F. | >210 | 211–215/215–220 | 211–213/215–218 |
| $T_{90}$, ° F. | <330 | 305–320 | 310–315 |
| $E_{200}$, ° F. | <=46 | 40–45 | 41–44 |
| $E_{300}$, ° F. | <=90 | 82–89 | 84–88 |
| RVP, psi | <=7.0 | 6.6–6.9 | 6.7–6.85 |
| S, ppmw | <=50 | 10–25 (SUL) | 10–20 (SUL) |
| Oxygen, wt % | <=3.5 | 1.5–2.9 | 1.8–2.2 |
| Aromatics, vol % | <=35 | 10–28 | 10–20 |
| Olefins, vol % | <=10 | 1–6 | 1–5 |
| Benzene, vol % | <=1.0 | <=0.80 (SUL) | <=0.70 (SUL) |
| Paraffins, vol % | <=75 | <70 | <65 |
| API° | >=59 | 60–62 (SUL) | 60–62 (SUL) |

Note:
SUL = Super Unleaded, (R + M)/2 >= 92
RUL = Regular Unleaded, (R + M)/2 = 87–90
$E_{200}$ is the percent by volume of fuel boiling ≦ 200° F.
$E_{300}$ is the percent by volume of fuel boiling ≦ 300° F.

Examples of super unleaded (R+M)/2=92 and regular unleaded (R+M)=87, conforming to these parameters and providing emissions levels no greater than those allowable under current CARB requirements would be as follows:

TABLE 4

GASOLINE FUELS—SUPER UNLEADED GRADE

| SUL No. | API | Aromatics | Benzene | $E_{200}$ | $E_{300}$ | Olefins | RVP | S, ppm | Oxy, wt % | $T_{50}$ | $T_{90}$ |
|---|---|---|---|---|---|---|---|---|---|---|---|
| 1 | 61.40 | 13.3 | 0.3 | 43.4 | 85.8 | 0.9 | 6.89 | 15 | 2.4 | 211 | 320 |
| 2 | 59.00 | 24.2 | 0.92 | 43.9 | 87.3 | 4.7 | 6.78 | 9 | 1.8 | 211 | 311 |
| 3 | 61.20 | 16.9 | 0.65 | 42.9 | 88.5 | 5.1 | 6.95 | 10 | 1.9 | 211 | 307 |
| 4 | 59.00 | 21 | 0.82 | 43.8 | 87.3 | 3.8 | 6.96 | 13 | 1.8 | 211 | 311 |
| 5 | 59.10 | 21.9 | 0.81 | 43.9 | 87.4 | 2.9 | 6.77 | 17 | 1.9 | 211 | 310 |
| 6 | 58.80 | 24.7 | 0.81 | 44 | 87.3 | 3.7 | 6.64 | 18 | 1.9 | 211 | 311 |
| 7 | 60.10 | 22.2 | 0.8 | 43.8 | 88.1 | 3.3 | 6.83 | 19 | 1.8 | 211 | 308 |
| 8 | 59.00 | 25.7 | 0.74 | 42.8 | 87.2 | 4.4 | 6.79 | 9 | 2 | 212 | 311 |
| 9 | 59.70 | 23.1 | 0.7 | 42 | 87 | 3 | 6.83 | 15 | 1.9 | 213 | 311 |
| 10 | 61.00 | 18.1 | 0.3 | 41.2 | 87.1 | 1.4 | 6.83 | 11 | 2.5 | 214 | 314 |

TABLE 5

GASOLINE FUELS—REGULAR UNLEADED GRADE

| RUL No. | API | Aromatics | Benzene | $E_{200}$ | $E_{300}$ | Olefins | RVP | S, ppm | Oxy, wt % | $T_{50}$ | $T_{90}$ |
|---|---|---|---|---|---|---|---|---|---|---|---|
| 1 | 59.70 | 11.6 | 0.3 | 44.1 | 84.6 | 5.1 | 6.69 | 27 | 2.4 | 213 | 320 |
| 2 | 58.70 | 16 | 0.3 | 44.6 | 83.2 | 2.5 | 6.98 | 25 | 2.6 | 213 | 325 |
| 3 | 59.30 | 17.4 | 0.4 | 43.9 | ? | 2.2 | 6.91 | 22 | 2.1 | 213 | 315 |
| 4 | 58.70 | 14.2 | 0.3 | 43.3 | 84.3 | 5.4 | 6.6 | 24 | 2.3 | 215 | 321 |
| 5 | 57.80 | 18.2 | 0.5 | 44.6 | 85.6 | 4.4 | 6.85 | 16 | 2.2 | 212 | 315 |
| 6 | 57.60 | 20.4 | 0.6 | 44.4 | 85.6 | 4.1 | 6.61 | 17 | 2.2 | 212 | 312 |
| 7 | 57.90 | 22.3 | 0.7 | 44.1 | 87.2 | 5 | 6.82 | 15 | 2 | 212 | 307 |
| 8 | 57.60 | 19.2 | 0.6 | 45 | 85 | 6.7 | 6.66 | 19 | 2.1 | 211 | 316 |

The gasolines set out above demonstrate that with RVP below 7.0 psi and sulfur below 50 ppmw, desirably below 30 ppmw, e.g., 25, 20, 15 ppmw or even lower, with oxygenate contents varying up to the permitted CARB cap of 2.7 wt %, conforming pump gasolines may be blended.

The term pump gasoline is used here to refer to gasolines which are to be sold in commerce for automotive uses from the normal industry distribution system after manufacture in quantity by normal manufacturing and blending operations. This will normally imply that on a given day, and usually on a daily basis over a period of at least one month, at least 1,000 and more preferably at least 10,000 automobiles will be provided with a "pump gasoline" of the type described here. The present pump gasolines are especially useful in highly congested areas, e.g., within the limits of a city or county encompassing a population of 500,000 or more people.

The effect of appropriate control of compositional parameters may be shown by the following comparisons. A number of low RVP gasolines are compared for emissions with a gasoline conforming to the flat limits of $T_{50}$ 210° F., $T_{90}$ 300° F., sulfur 40 ppmw, aromatics 25 vol %, and olefins 6 vol %. Oxygen was held at 1.8–2.2% and benzene at 1%, RVP meets the 7 psi limit.

Table 6 above shows that not all gasolines may be conforming since reduction of all pollutants is required and Fuels No. 6, 8, 9, 13, 18 have elevations in one of the pollutant levels. All gasolines have, however, $T_{50}$ values above 210° F., indicating that it is possible to achieve conformance with regulatory standards without maintaining $T_{50}$ below that value.

That the use of $T_{50}$ values above 210° F. for reducing emissions below regulatory limits is not indispensable is shown by the following data. Further examples of reduced pollution gasolines (SUL) are set out below in Table 7, the first three being in conformity with the existing CARB CBG requirements while the second three do not conform to existing requirements but nevertheless are comparable in terms of total pollutant emissions when evaporative emissions are accounted for.

TABLE 7

| RVP psi | $T_{50}$ ° F. | $T_{90}$ ° F. | Aromatics vol % | Olefins vol % | Oxy - min wt % | Oxy - max wt % | Sulfur ppmw | Benzene vol % |
|---|---|---|---|---|---|---|---|---|
| CBG fuels with existing model | | | | | | | | |
| 7 | 214 | 300 | 22 | 4 | 1.8 | 2.2 | 15 | 0.8 |
| 7 | 212 | 310 | 22 | 4 | 1.8 | 2.2 | 15 | 0.8 |
| 7 | 200 | 325 | 20 | 10 | 1.8 | 2.2 | 10 | 0.7 |
| CBG fuels with modified model | | | | | | | | |
| 6.6 | 220 | 310 | 20 | 4 | 1.8 | 2.2 | 10 | 0.7 |

TABLE 6

RELATIVE POLLUTANT LEVELS

| | Fuel No. 1 | 2 | 3 | 4 | 5 | 6 | 7 | 8 | 9 | 10 |
|---|---|---|---|---|---|---|---|---|---|---|
| RVP | 6.89 | 6.78 | 6.95 | 6.96 | 6.77 | 6.64 | 6.69 | 6.98 | 6.91 | 6.6 |
| $T_{50}$ | 211 | 211 | 211 | 211 | 211 | 211 | 213 | 213 | 213 | 215 |
| $T_{90}$ | 320 | 311 | 307 | 311 | 310 | 311 | 320 | 325 | 315 | 321 |
| Aromatics | 13.3 | 24.2 | 16.9 | 21 | 21.9 | 24.7 | 11.6 | 16 | 17.4 | 14.2 |
| Olefins | 0.9 | 4.7 | 5.1 | 3.8 | 2.9 | 3.7 | 5.1 | 2.5 | 2.2 | 5.4 |
| Oxygen | 2.4 | 1.8 | 1.9 | 1.8 | 1.9 | 1.9 | 2.4 | 2.6 | 2.1 | 2.3 |
| Sulfur | 15 | 9 | 10 | 13 | 17 | 18 | 27 | 25 | 22 | 24 |
| Benzene | 0.3 | 0.92 | 0.65 | 0.82 | 0.81 | 0.81 | 0.3 | 0.3 | 0.4 | 0.3 |
| Relative Pollutant Levels | | | | | | | | | | |
| NOx | −4.33301 | −1.98592 | −2.48582 | −2.65 | −2.83914 | −2.13134 | −2.07 | −2.75908 | −3.5995 | −1.98735 |
| VOC | −2.4844 | −0.40846 | −2.84479 | −0.68 | −0.11216 | 0.513447 | −2.41 | 1.065478 | 0.426402 | −0.04762 |
| Toxics | −18.5283 | −2.95228 | −11.1558 | −7.45 | −8.03918 | −4.75931 | −12.85 | −13.327 | −14.5965 | −10.9451 |

| | Fuel No. 11 | 12 | 13 | 14 | 15 | 16 | 17 | 18 |
|---|---|---|---|---|---|---|---|---|
| RVP | 6.85 | 6.61 | 6.83 | 6.83 | 6.82 | 6.66 | 6.83 | 6.79 |
| $T_{50}$ | 212 | 212 | 213 | 214 | 212 | 211 | 211 | 212 |
| $T_{90}$ | 315 | 312 | 311 | 314 | 307 | 316 | 308 | 311 |
| Aromatics | 18.2 | 20.4 | 23.1 | 18.1 | 22.3 | 19.2 | 22.2 | 25.7 |
| Olefins | 4.4 | 4.1 | 3 | 1.4 | 5 | 6.7 | 3.3 | 4.4 |
| Oxygen | 2.2 | 2.2 | 1.9 | 2.5 | 2 | 2.1 | 1.8 | 2 |
| Sulfur | 16 | 17 | 15 | 11 | 15 | 19 | 19 | 9 |
| Benzene | 0.5 | 0.6 | 0.7 | 0.3 | 0.7 | 0.6 | 0.8 | 0.74 |
| Relative Pollutant Levels | | | | | | | | |
| NOx | −2.64111 | −2.46482 | −2.75153 | −3.56778 | −1.7807 | −1.33299 | −2.50787 | −1.96937 |
| VOC | −0.56947 | −0.04891 | 1.027375 | −0.12701 | −0.45248 | −0.69121 | −0.20234 | 0.326799 |
| Toxics | −10.8406 | −9.39936 | −7.91296 | −16.3274 | −6.92238 | −5.97076 | −7.71766 | −4.31875 |

TABLE 7-continued

| RVP psi | $T_{50}$ ° F. | $T_{90}$ ° F. | Aromatics vol % | Olefins vol % | Oxy - min wt % | Oxy - max wt % | Sulfur ppmw | Benzene vol % |
|---|---|---|---|---|---|---|---|---|
| 6.6 | 218 | 310 | 24 | 4 | 1.8 | 2.2 | 15 | 0.7 |
| 6.6 | 214 | 320 | 24 | 4 | 1.8 | 2.2 | 20 | 0.7 |

The acceptability of higher $T_{50}$ values when the evaporative factor is added is further shown by Table 8 following setting out the compositions of pump gasolines with total emissions levels no higher than those permitted by current California standards when evaporative emissions are accounted for.

TABLE 8

| | $T_{50}$ ° F. | Aroms., vol % | $T_{90}$ ° F. | | Sulfur ppm | Olefins vol % | | Oxygen, wt % | | Benzene vol % | RVP psi |
|---|---|---|---|---|---|---|---|---|---|---|---|
| No. | Max. | Max. | Min. | Max. | Max. | Min. | Max. | Min. | Max. | Max. | Max. |
| 19 | 214 | 12 | | 330 | 35 | | 10 | 0 | 1 | 0.7 | 6.6 |
| 20 | 214 | 16 | | 320 | 25 | | 10 | 0 | 1 | 0.7 | 6.6 |
| 21 | 214 | 16 | | 325 | 25 | 2 | 10 | 0 | 1 | 0.7 | 6.6 |
| 22 | 214 | 16 | | 330 | 20 | 2 | 10 | 0 | 1 | 0.7 | 6.6 |
| 23 | 214 | 16 | | 330 | 25 | 4 | 10 | 0 | 1 | 0.7 | 6.6 |
| 24 | 214 | 20 | | 310 | 15 | 2 | 8 | 0 | 1 | 0.7 | 6.6 |
| 25 | 214 | 20 | | 310 | 20 | 4 | 8 | 0 | 1 | 0.7 | 6.6 |
| 26 | 214 | 20 | | 305 | 25 | 6 | 8 | 0 | 1 | 0.7 | 6.6 |
| 27 | 214 | 20 | | 315 | 15 | 4 | 8 | 0 | 1 | 0.7 | 6.6 |
| 28 | 214 | 20 | 310 | 320 | 20 | 6 | 10 | 0 | 1 | 0.7 | 6.6 |
| 29 | 214 | 20 | 295 | 320 | 10 | 4 | 10 | 0 | 1 | 0.7 | 6.6 |
| 30 | 214 | 20 | 295 | 325 | 10 | 6 | 10 | 0 | 1 | 0.7 | 6.6 |
| 31 | 214 | 24 | | 305 | 15 | 6 | 8 | 0 | 1 | 0.7 | 6.6 |
| 32 | 214 | 24 | | 305 | 10 | 4 | 8 | 0 | 1 | 0.7 | 6.6 |
| 33 | 214 | 24 | | 310 | 10 | 6 | 8 | 0 | 1 | 0.7 | 6.6 |
| 34 | 214 | 28 | | 295 | 10 | 4 | 6 | 0 | 1 | 0.7 | 6.6 |
| 35 | 214 | 28 | 295 | 300 | 10 | 6 | 8 | 0 | 1 | 0.7 | 6.6 |
| 36 | 218 | 12 | | 330 | 25 | 2 | 10 | 0 | 1 | 0.7 | 6.6 |
| 37 | 218 | 12 | | 330 | 30 | 4 | 10 | 0 | 1 | 0.7 | 6.6 |
| 38 | 218 | 16 | | 320 | 20 | 8 | 10 | 0 | 1 | 0.7 | 6.6 |
| 39 | 218 | 16 | | 320 | 15 | 6 | 10 | 0 | 1 | 0.7 | 6.6 |
| 40 | 218 | 16 | | 320 | 10 | 4 | 10 | 0 | 1 | 0.7 | 6.6 |
| 41 | 218 | 16 | | 325 | 15 | 8 | 10 | 0 | 1 | 0.7 | 6.6 |
| 42 | 218 | 16 | | 325 | 10 | 6 | 10 | 0 | 1 | 0.7 | 6.6 |
| 43 | 218 | 16 | | 330 | 10 | 8 | 10 | 0 | 1 | 0.7 | 6.6 |
| 44 | 218 | 20 | | 310 | 5 | 8 | 10 | 0 | 1 | 0.7 | 6.6 |
| 45 | 214 | 12 | 295 | 320 | 35 | | 8 | 1 | 2 | 0.7 | 6.6 |
| 46 | 214 | 12 | 295 | 320 | 25 | 8 | 10 | 1 | 2 | 0.7 | 6.6 |
| 47 | 214 | 12 | 320 | 330 | 35 | | 10 | 1 | 2 | 0.7 | 6.6 |
| 48 | 214 | 16 | 295 | 325 | 35 | | 8 | 1 | 2 | 0.7 | 6.6 |
| 49 | 214 | 16 | 325 | 330 | 25 | 2 | 10 | 1 | 2 | 0.7 | 6.6 |
| 50 | 214 | 20 | 295 | 315 | 25 | 2 | 8 | 1 | 2 | 0.7 | 6.6 |
| 51 | 214 | 20 | | 320 | 20 | 2 | 8 | 1 | 2 | 0.7 | 6.6 |
| 52 | 214 | 20 | | 325 | 15 | 4 | 8 | 1 | 2 | 0.7 | 6.6 |
| 53 | 214 | 20 | | 330 | 10 | 6 | 8 | 1 | 2 | 0.7 | 6.6 |
| 54 | 214 | 24 | | 305 | 25 | 2 | 6 | 1 | 2 | 0.7 | 6.6 |
| 55 | 214 | 24 | | 310 | 15 | 2 | 8 | 1 | 2 | 0.7 | 6.6 |
| 56 | 214 | 24 | | 315 | 15 | 4 | 8 | 1 | 2 | 0.7 | 6.6 |
| 57 | 214 | 24 | | 315 | 20 | 6 | 8 | 1 | 2 | 0.7 | 6.6 |
| 58 | 214 | 24 | | 320 | 15 | 6 | 8 | 1 | 2 | 0.7 | 6.6 |
| 59 | 214 | 28 | | 300 | 25 | 2 | 6 | 1 | 2 | 0.7 | 6.6 |
| 60 | 214 | 28 | | 305 | 25 | 4 | 6 | 1 | 2 | 0.7 | 6.6 |
| 61 | 214 | 28 | | 310 | 15 | 4 | 6 | 1 | 2 | 0.7 | 6.6 |
| 62 | 214 | 28 | | 310 | 10 | 2 | 6 | 1 | 2 | 0.7 | 6.6 |
| 63 | 214 | 28 | | 315 | 5 | 2 | 6 | 1 | 2 | 0.7 | 6.6 |
| 64 | 218 | 12 | | 325 | 35 | | 8 | 1 | 2 | 0.7 | 6.6 |
| 65 | 218 | 12 | | 330 | 25 | | 10 | 1 | 2 | 0.7 | 6.6 |
| 66 | 218 | 12 | 310 | 330 | 30 | 2 | 10 | 1 | 2 | 0.7 | 6.6 |
| 67 | 218 | 16 | | 305 | 30 | 4 | 8 | 1 | 2 | 0.7 | 6.6 |
| 68 | 218 | 16 | | 315 | 25 | 4 | 8 | 1 | 2 | 0.7 | 6.6 |
| 69 | 218 | 16 | | 320 | 15 | 2 | 8 | 1 | 2 | 0.7 | 6.6 |
| 70 | 218 | 16 | | 325 | 15 | 4 | 8 | 1 | 2 | 0.7 | 6.6 |
| 71 | 218 | 16 | 315 | 325 | 20 | 6 | 10 | 1 | 2 | 0.7 | 6.6 |
| 72 | 218 | 16 | | 330 | 10 | 6 | 8 | 1 | 2 | 0.7 | 6.6 |
| 73 | 218 | 20 | | 305 | 15 | 4 | 8 | 1 | 2 | 0.7 | 6.6 |
| 74 | 218 | 20 | | 305 | 20 | 6 | 8 | 1 | 2 | 0.7 | 6.6 |
| 75 | 218 | 20 | | 310 | 10 | 4 | 8 | 1 | 2 | 0.7 | 6.6 |
| 76 | 218 | 20 | | 310 | 5 | 2 | 8 | 1 | 2 | 0.7 | 6.6 |

TABLE 8-continued

| | $T_{50}$ ° F. | Aroms., vol % | $T_{90}$ ° F. | | Sulfur ppm | Olefins vol % | | Oxygen, wt % | | Benzene vol % | RVP psi |
|---|---|---|---|---|---|---|---|---|---|---|---|
| No. | Max. | Max. | Min. | Max. | Max. | Min. | Max. | Min. | Max. | Max. | Max. |
| 77 | 218 | 20 | | 315 | 5 | 4 | 8 | 1 | 2 | 0.7 | 6.6 |
| 78 | 218 | 20 | | 320 | 5 | 6 | 10 | 1 | 2 | 0.7 | 6.6 |
| 79 | 218 | 24 | | 295 | 5 | 4 | 8 | 1 | 2 | 0.7 | 6.6 |
| 80 | 214 | 12 | | 330 | 35 | | 6 | 2 | 2.7 | 0.7 | 6.6 |
| 81 | 214 | 12 | 305 | 330 | 20 | | 8 | 2 | 2.7 | 0.7 | 6.6 |
| 82 | 214 | 16 | | 315 | 35 | | 6 | 2 | 2.7 | 0.7 | 6.6 |
| 83 | 214 | 16 | | 320 | 30 | | 6 | 2 | 2.7 | 0.7 | 6.6 |
| 84 | 214 | 16 | | 325 | 20 | | 6 | 2 | 2.7 | 0.7 | 6.6 |
| 85 | 214 | 16 | 315 | 330 | 15 | | 8 | 2 | 2.7 | 0.7 | 6.6 |
| 86 | 214 | 20 | | 320 | 30 | | 4 | 2 | 2.7 | 0.7 | 6.6 |
| 87 | 214 | 20 | 305 | 320 | 30 | | 6 | 2 | 2.7 | 0.7 | 6.6 |
| 88 | 214 | 20 | | 325 | 20 | | 6 | 2 | 2.7 | 0.7 | 6.6 |
| 89 | 214 | 20 | 320 | 330 | 10 | | 8 | 2 | 2.7 | 0.7 | 6.6 |
| 90 | 214 | 20 | | 330 | 15 | 4 | 6 | 2 | 2.7 | 0.7 | 6.6 |
| 91 | 214 | 24 | | 310 | 35 | | 4 | 2 | 2.7 | 0.7 | 6.6 |
| 92 | 214 | 24 | | 315 | 25 | | 4 | 2 | 2.7 | 0.7 | 6.6 |
| 93 | 214 | 24 | | 320 | 15 | | 4 | 2 | 2.7 | 0.7 | 6.6 |
| 94 | 214 | 24 | 305 | 315 | 20 | | 6 | 2 | 2.7 | 0.7 | 6.6 |
| 95 | 214 | 24 | 295 | 320 | 15 | | 6 | 2 | 2.7 | 0.7 | 6.6 |
| 96 | 214 | 24 | 295 | 325 | 10 | 4 | 6 | 2 | 2.7 | 0.7 | 6.6 |
| 97 | 214 | 28 | | 305 | 35 | | 4 | 2 | 2.7 | 0.7 | 6.6 |
| 98 | 214 | 28 | | 310 | 30 | | 4 | 2 | 2.7 | 0.7 | 6.6 |
| 99 | 214 | 28 | 305 | 315 | 10 | | 6 | 2 | 2.7 | 0.7 | 6.6 |
| 100 | 214 | 28 | 305 | 320 | 10 | 2 | 6 | 2 | 2.7 | 0.7 | 6.6 |
| 101 | 218 | 12 | | 330 | 35 | | 6 | 2 | 2.7 | 0.7 | 6.6 |
| 102 | 218 | 12 | 305 | 330 | 20 | | 8 | 2 | 2.7 | 0.7 | 6.6 |
| 103 | 218 | 16 | | 315 | 35 | | 6 | 2 | 2.7 | 0.7 | 6.6 |
| 104 | 218 | 16 | | 320 | 25 | | 6 | 2 | 2.7 | 0.7 | 6.6 |
| 105 | 218 | 16 | | 325 | 20 | | 6 | 2 | 2.7 | 0.7 | 6.6 |
| 106 | 218 | 16 | 315 | 325 | 15 | 4 | 8 | 2 | 2.7 | 0.7 | 6.6 |
| 107 | 218 | 16 | 315 | 330 | 15 | 6 | 8 | 2 | 2.7 | 0.7 | 6.6 |
| 108 | 218 | 20 | | 310 | 20 | | 6 | 2 | 2.7 | 0.7 | 6.6 |
| 109 | 218 | 20 | | 315 | 15 | | 6 | 2 | 2.7 | 0.7 | 6.6 |
| 110 | 218 | 24 | | 300 | 20 | | 4 | 2 | 2.7 | 0.7 | 6.6 |
| 111 | 218 | 24 | | 305 | 15 | | 6 | 2 | 2.7 | 0.7 | 6.6 |
| 112 | 218 | 24 | | 310 | 10 | | 6 | 2 | 2.7 | 0.7 | 6.6 |
| 113 | 218 | 28 | | 300 | 20 | | 4 | 2 | 2.7 | 0.7 | 6.6 |
| 114 | 218 | 28 | | 305 | 10 | | 4 | 2 | 2.7 | 0.7 | 6.6 |
| 115 | 218 | 28 | | 315 | 5 | 4 | 6 | 2 | 2.7 | 0.7 | 6.6 |

The effect of changes in $T_{50}$ is shown in FIG. 1, with all other properties held at the flat limits set out above. FIG. 1 plots the percentage change in emissions against values of $T_{50}$ (° F.).

This figure demonstrates the sensitivity of hydrocarbon emissions and toxics to $T_{50}$ although NOx is insensitve to changes in this parameter. The addition of the RVP factor to the CARB Predictive Model (included in CARB emission inventory models) would, however, provide reductions in the hydrocarbon evaporative levels which would increase the flexibility to accommodate changes, both in increases in $T_{50}$ as well as in reduced oxygenate levels. Even a few tenths of one psi would, when factoroed appropriately into the model improve blending flexibility for pump gasolines.

An alternative approach is to decrase $T_{50}$ below the 210° F. figure, as noted for the third conforming fuel (above) within the existing CARB model which has the potential to use a higher value for $T_{90}$, including potential for extending gasoline end point and so increasing gasoline volume production. This, in combination with other appropriate compositional parameters as set out above, e.g., sulfur, olefins, aromatics, benzene, RVP, oxygen, $E_{200}$, $E_{300}$, values of $T_{50}$ in the range 200 to 210° F. coupled with values of $T_{90}$ from 315 to 330° F., usually 315 to 325° F., may be found useful from the viewpoint of giving greater blend flexibility without increasing emissions above regulatory limits. Relatively higher values of $T_{50}$ may be encountered more frequently in the higher octane grades, especially SUL (92–93 octane), associated with the higher levels or aromatics in SUL, whereas RUL (87 octane) may derive octane from the olefin content.

The use of $T_{90}$ values at the upper end of the permissible range is not required for emissions although it is desirable to increase the volume of the gasoline pool. Lower values for $T_{90}$ can be used at the expense of volume, for example, $T_{90}$ from 280 to 300° F., e.g., from 290 to 300° F.

Figure 2:
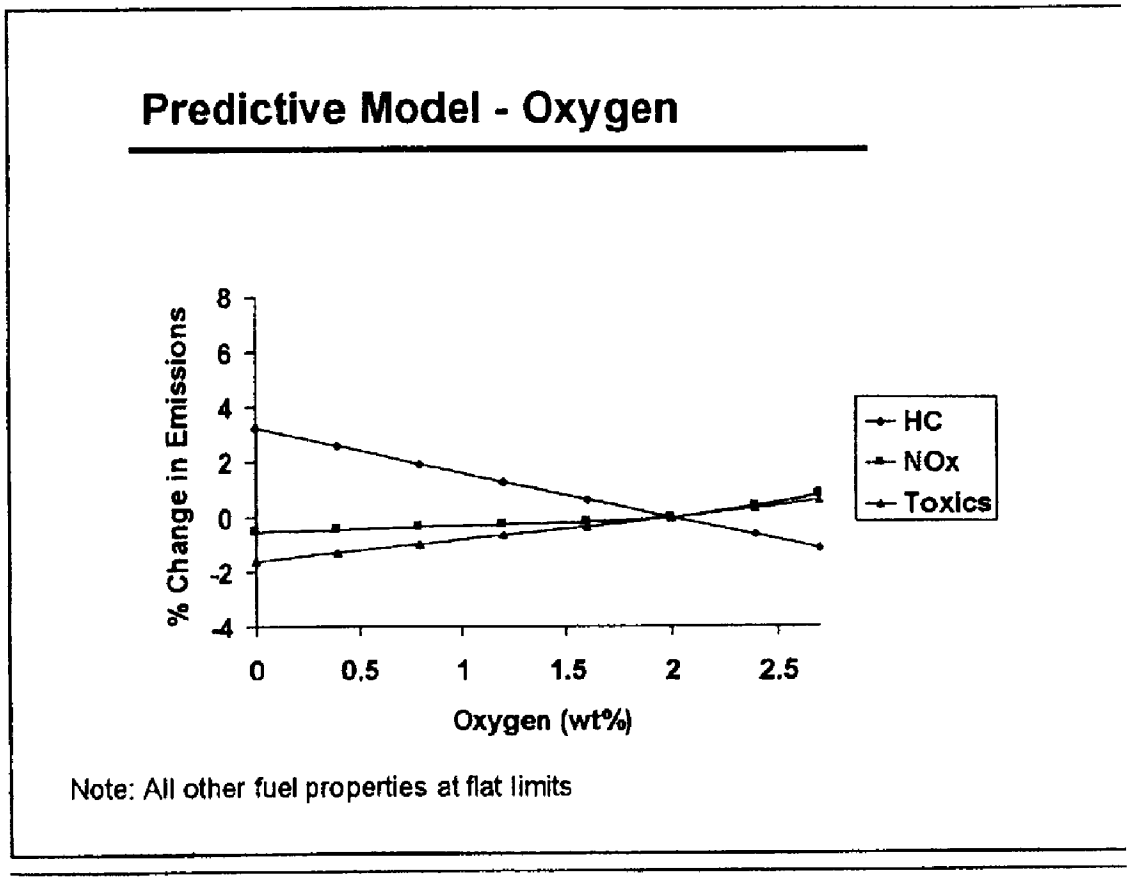
FIG. 2 presents the percentage change in emissions in response to oxygen content, all other fuel properties being held constant.

The effects of oxygenate content is shown in FIG. 2 which plots the percentage change in emissions against the oxygen content (as oxygen), again with other fuel properties held at the flat limits set out above.

As shown in this figure, the hydrocarbon emissions decline with increasing oxygenate levels although there is a slight increase in NOx and toxics over the range investigated. The levels of NOx and toxics are, however, lower than those of the reference (flat limits) fuel up to an oxygenate content of 2.0 percent, within the CBG limits.

The provision of oxygenate is becoming problematical since there are concerns about the spread of the most commonly used oxygenate, methyl tert-butyl ether (MTBE) into the groundwater. Similar concerns arise also with other ethers such as tert.-amyl methyl ether (TAME) and ethyl tert-butyl ether (ETBE). It may therefore be desirable to use alternative sources of oxygen such as ethanol even though ethanol itself gives rise to volatility problems and possibly other concerns, including the volumetric energy content, which is significantly lower than that of the base hydrocarbons. The use of ethanol in amounts up to about 3.5wt % (as oxygen) is allowed if appropriate other adjustments to composition are made. Other oxygenates including alcohols such iso-propanol (IPA), as well as ethers such as di-iso-propyl ether (DIPE), MTBE, TAME, ETBE may be used in accordance with the regulatory requirements in amounts up to 2.7 wt %, usually from 1.8 to 2.2 wt % (all oxygenates expressed as wt % oxygen).

Figure 3:
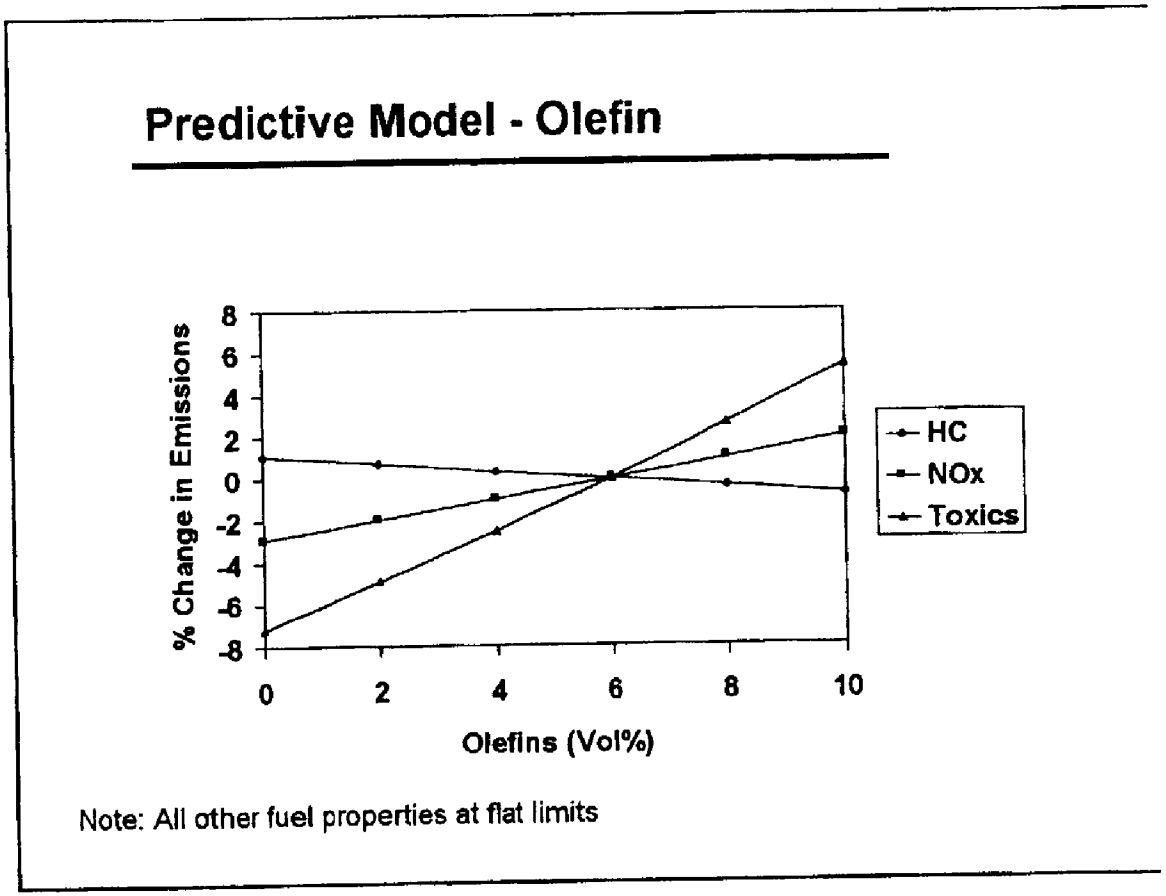
FIG. 3 presents the percentage change in emissions in response to olefin content, all other fuels properties being held constant.

The effect of olefins is shown graphically in FIG. 3, plotting percentage change in emissions against olefin content, again with other fuel properties at flat limits. Although, in this case, there is a relatively sharp increase in toxics emissions with increasing olefin content, the level of toxics emissions at olefin levels up to about 6 vol % remains below that of the flat limits reference gasoline. Thus, olefin levels up to about 6 vol % should be tolerable. Hydrocarbon and NOx emissions are inversely related with a smaller dependence on olefin content. It is notable that the hydrocarbon emissions are greater at olefin levels up to about 6 vol % but if the RVP factor is included, it may be possible to reduce overall HC emissions, as shown above. Olefin levels up to the legally permitted values of 10 vol % (current legal limit) or even higher, for example, up to 15 vol % may not prove to be environmentally unacceptable. Since olefins tend to have a favorable effect on octane, their inclusion in motor pump gasolines is desirable from the consumer's point of view as well as that of the refiner who tends to produce a large proportion of gasoline product by catalytic cracking, a process which results in relatively large quantities of olefins, especially in the front end of the gasoline. Economically, the use of olefins for octane in RUL is justified as compared to alkylate in the more expensive higher octane grade SUL (92–93 octane). The use of catalytically cracked gasoline is also associated with the presence of significant amounts of aromtics which again are desirable from the viewpoint of octane rating—aromatics are high octane components—as well as from the view point of gas mileage, another environmental factor, since aromatics are high energy density components. The presence of relatively high aromatics levels is not inconsistent with good emissions behavior and for this reason, aromatics levels up to 25–35 vol % can readily be accomodated in the gasolines.

Another factor requiring attention during the blending is Driveability Index (DI). Driveability index is conventionally determined and stated according to ASTM D-86. According to this method, three distillation temperatures, $T_{10}$, $T_{50}$, and $T_{90}$ are determined for a sample. The driveability index for the sample is then determined according to the following equation:

$$\text{Driveability index}=1.5(T_{10})+3.0(T_{50})+1(T_{90})$$

Since DI is relatively more dependent on $T_{50}$ than on $T_{10}$ and $T_{90}$, increases in $T_{50}$ as outlined above will tend to favor improvements in DI, which is desirable from the consumer's point of view. Representative values of DI for the gasolines set out here are in the range of 1100 to 1200, more usually 1120 to 1185, for example, from 1135 to 1165.

What is claimed is:

1. An unleaded gasoline pump fuel which has the following properties:

| | |
|---|---|
| $T_{10}$, ° F. | <=140 |
| $T_{50}$, ° F. | >215 = <220 |
| $T_{90}$, ° F. | <330 |
| RVP, psi | <=7.0 |
| S, ppmw | <=50 |
| Oxygen, wt % | <=3.5 |
| Aromatics, vol % | not more than 28 |
| Olefins, vol % | <=10 |
| Benzene, vol % | <=1.0 |
| Paraffins, vol. pct. | <=75 |
| API° | >=59. |

2. The fuel according to claim 1 which has a RVP of 6.6 psi maximum.

3. The fuel according to claim 1 which has a RVP of 6.6 to 6.9 psi.

4. An unleaded gasoline pump fuel which possesses the following properties:

| | |
|---|---|
| $T_{10}$, ° F. | <=140 |
| $T_{50}$, ° F. | >215 = <220 |
| $T_{90}$, ° F. | 315–330 |
| S, ppmw | <=35 |
| Oxygen, wt % | <=2 |
| Aromatics, vol % | not more than 28 |
| Olefins, vol % | <=10 |
| Benzene, vol % | <=1.0 |
| Paraffins, vol % | <=75 |
| API° | >=59 |
| RVP, psi | <=7.0. |

5. The fuel according to claim 1 or 4 which has an octane rating of 92 to 93 (R+M)/2 and an aromatics content of 12 to 20 vol percent and a benzene content of not more than 0.80 vol %.

6. The fuel according to claim 1 or 4 which has an octane rating of 87 (R+M)/2 and an aromatics content of 12 to 20 vol percent and a benzene content of not more than 0.70 vol %.

7. The fuel according to claim 1 or 4 which has a sulfur content of not more than 25 ppmw.

* * * * *